US012791153B2

(12) United States Patent
Alrudayni et al.

(10) Patent No.: US 12,791,153 B2
(45) Date of Patent: Nov. 10, 2026

(54) ASSESSMENT OF EXTERNAL COATING DEGRADATION SEVERITY FOR BURIED PIPELINES

(71) Applicant: Saudi Arabian Oil Company, Dhahran (SA)

(72) Inventors: Mohammed A. Alrudayni, Al Khobar (SA); Naim Dakwar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 939 days.

(21) Appl. No.: 17/003,482

(22) Filed: Aug. 26, 2020

(65) Prior Publication Data

US 2022/0065406 A1 Mar. 3, 2022

(51) Int. Cl.

| | |
|---|---|
| ***F17D 5/06*** | (2006.01) |
| ***C23F 13/04*** | (2006.01) |
| ***G06Q 10/20*** | (2023.01) |
| ***G06Q 50/06*** | (2024.01) |

(52) U.S. Cl.

CPC ................ *F17D 5/06* (2013.01); *C23F 13/04* (2013.01); *G06Q 10/20* (2013.01); *G06Q 50/06* (2013.01)

(58) Field of Classification Search

CPC ........... F17D 5/06; C23F 13/04; G06Q 10/20; G06Q 50/06

See application file for complete search history.

(56) References Cited

U.S. PATENT DOCUMENTS

| | | | | |
|---|---|---|---|---|
| 2,616,844 | A * | 11/1952 | Klumb | C23F 13/02 204/196.15 |
| 3,483,466 | A * | 12/1969 | Beaver | G01N 27/904 324/220 |
| 8,447,532 | B1 * | 5/2013 | Goroshevskiy | G01L 1/125 702/42 |
| 9,683,924 | B2 | 6/2017 | Gluskin et al. | |
| 2005/0006250 | A1 * | 1/2005 | Russell | C23F 13/04 205/726 |

(Continued)

FOREIGN PATENT DOCUMENTS

| | | |
|---|---|---|
| KR | 20090003903 | 1/2009 |

OTHER PUBLICATIONS

"Martins Amauri , A Fuzzy Logic Model Designed for Quantitative Risk Analysis based on ECDA Data, 2015, 1-9" (Year: 2015).*

(Continued)

*Primary Examiner* — Catherine T. Rastovski
*Assistant Examiner* — Sharah Zaab
(74) *Attorney, Agent, or Firm* — Fish & Richardson P.C.

(57) ABSTRACT

The present disclosure describes a computer-implemented method that includes: determining a category of a buried pipeline based on a compatibility with cathodic protection and a setup status of the buried pipeline, wherein the buried pipeline includes an external coating on an exterior surface of the buried pipeline; accessing input data from one or more inspection tools, wherein the one or more inspection tools are configured to monitor respective operating conditions of the buried pipeline; analyzing the input data from the one or more inspection tools in a manner specific to the determined category of the buried pipeline; and determining a prioritization schedule to maintain the external coating on the exterior surface of the buried pipeline.

12 Claims, 8 Drawing Sheets

(56) References Cited

U.S. PATENT DOCUMENTS

| | | | |
|---|---|---|---|
| 2014/0039648 A1* | 2/2014 | Boult ................. | G05B 23/0283 700/79 |
| 2017/0010382 A1 | 1/2017 | Mishkhes et al. | |
| 2018/0216246 A1 | 8/2018 | Chew et al. | |

OTHER PUBLICATIONS

Aboveground Survey Techniques for the Evaluation of Underground Pipeline Coating Condition, NACE, 2009, NACE International , 33 pages (Year: 2009).*

PCT International Search Report and Written Opinion in International Appln. No. PCT/US2021/047481, dated Jan. 11, 2022, 15 pages.

Martins et al., "A Fuzzy Logic Model Designed for Quantitative Risk Analysis based on ECDA Data," NACE-2015-5675, Paper presented at the Corrosion 2015, Dallas, Texas, Mar. 2015, 9 pages.

Enbridge, "Evaluation of technologies to assess the condition of pipe coating on Line 5," Enbridge Energy, Report to the State of Michigan, Jun. 30, 2018, 127 pages.

Kowalski et al., "Enhanced Corrosion Management Analysis of Pipelines," NACE International, presented at Corrosion Conference and Expo, NACE C2017-9729, 2017, 12 pages.

materialsperformance.com, [online], "Corrosion Basics: Close-Interval Potential Surveys," Roberge, retrieved on Aug. 25, 2020, retrieved from URL <http://materialsperformance.com/articles/cathodic-protection/2016/03/corrosion-basics-close-interval-potential-surveys>, published May 4, 2020, 7 pages.

NACE International, "Aboveground Survey Techniques for the Evaluation of Underground Pipeline Coating Condition," NACE TM0109-2009, Item 21254, Mar. 2009, 36 pages.

NACE International, "Control of External Corrosion on Underground or Submerged Metallic Piping Systems," Standard Recommended Practice, NACE Standard SP0169, 2013, 60 pages.

NACE International, "Pipeline External Corrosion Direct Assessment Methodology," NACE Standard Practice SP0502-2010, Item No. 21097, Dec 2010, 57 pages.

Papavinasam, "Integration of Laboratory Test Results to Predict Field Performance of External Pipeline Coatings," NACE-2019-12797, NACE International, presented at Corrosion Conference and Expo, Mar. 24-28, 2019, 15 pages.

primis.phmsa.dot.gov, [online], "Fact Sheet: Close Interval Survey," retrieved from URL <https://primis.phmsa.dot.gov/comm/FactSheets/FSCloseInternalSurvey.htm>, retrieved on Aug. 25, 2020, date of revision Dec 1, 2011, 2 pages.

Ruschau and Kowalski, "Field Investigation of Aboveground Techniques for Detecting Coating Abnormalities," NACE International, presented at Corrosion NACExpo, 61st Annual Conference and Exposition, NACE-C2006-06191, Mar. 12-16, 2006, 15 pages.

Segall et al., "Evaluation of Classification and Prioritization Criteria Based on the Results of Direct Examinations," NACE International, presented at Corrosion Conference and Expo, NACE-C2008-08143, 2008, 13 pages.

Segall et al., "Use of ECDA Approach in Prioritization of ILI Anomalies," NACE C2012-0001231, 2012, 8 pages.

* cited by examiner

200

| 1st Modifier | Prioritization | | | | | | |
|---|---|---|---|---|---|---|---|
| Soil Resistivity & CP | 2nd Modifier: Metal_loss corrosion (ML) | | | | | inspection Tool 2 Classification | inspection Tool 1 Classification |
| | ML > 60% | 40%< ML< 60% | 30%< ML< 40% | 20%< ML< 30% | ML< 20% | | |
| Severe (e.g. Subkha) ρ <2,000 | I | I | I | S | M | Severe | Severe |
| | I | I | I | S | M | Moderate | |
| | I | I | S | M | M | Minor | |
| | I | I | I | S | M | Severe | Moderate |
| | I | I | S | M | M | Moderate | |
| | I | S | S | M | M | Minor | |
| | I | I | S | M | M | Severe | Minor |
| | I | S | S | M | M | Moderate | |
| | I | S | M | M | M | Minor | |
| Moderate (Soil 2,000< ρ <10,000) | I | I | S | M | M | Severe | Severe |
| | I | I | S | M | M | Moderate | |
| | I | S | S | M | M | Minor | |
| | I | I | S | M | M | Severe | Moderate |
| | I | S | S | M | M | Moderate | |
| | S | S | S | M | M | Minor | |
| | I | S | S | M | M | Severe | Minor |
| | S | S | S | M | M | Moderate | |
| | S | S | M | M | M | Minor | |
| Minor (e.g. Soft or Dry) Soil ρ >10,000 | I | S | M | M | M | Severe | Severe |
| | I | S | M | M | M | Moderate | |
| | S | M | M | M | M | Minor | |
| | I | S | M | M | M | Severe | Moderate |
| | S | S | M | M | M | Moderate | |
| | S | M | M | M | M | Minor | |
| | S | M | M | M | M | Severe | Minor |
| | S | M | M | M | M | Moderate | |
| | M | M | M | M | M | Minor | |

I = Immediate action required (including excavation & re-coating)

S = Scheduled action required (further evaluate on the excavation)

M = Suitable for monitoring

FIG. 2

300

| Measurement | Inspection Classification | | |
|---|---|---|---|
| | Minor | Moderate | Severe |
| Inspection TOOL 1 "CIS" | | | |
| A= OFF (Polarized) Potential [mV] | -950 mV < A < -850 mV | -850 mV < A < -650 mV | 650 mV < A |
| | OR | OR | OR |
| B= ON Potential [mV] | -1000 mV < B < -950 mV | -950 mV < B < -850 mV | -850 mV < B |
| | AND | AND | OR |
| C= ON/OFF Convergence [mV] | 50 mV < C < 70mV | 30 mV < C < 10mV | 10 mV < C |
| | OR | OR | OR |
| D= ON and/or OFF Profile Depression within 100ft span [mV/span] | 50 mV/span < D < 100mV/span | 100 mV/span < D < 200mV/span | 200 mV/span < D |
| Inspection TOOL 2 "ACCA" | | | |
| E= Current 98 Hz Frequency Signal Loss (-) [mdB(mA)/ft] | 3 mdb(mA)/ft < E < 7 mdb(mA)/ ft | 7 mdb(mA)/ft < E < 12 mdb(mA)/ft | 12 mdb(mA)/ft < E |
| | AND/OR | AND/OR | AND/OR |
| F= Current 4 Hz Frequency Signal Loss (-) [mdB(mA)/ft] | 20 mdb(mA)/ft < F < 40 mdb(mA)/ft | 40 mdb(mA)/ft < F < 60 mdb(mA)/ft | 60 mdb(mA)/ft < F |
| | AND | AND | OR |
| CP Level Modifier | Adequate CP Level | Adequate to Marginal CP Level | All indications with Inadequate CP Level |
| Inspection TOOL 3 "ACVG" | | | |
| G= Voltage Signal Loss (-) [dB(mV)] | 44 dB(mV) < G < 60 dB(mV) | 60 dB(mV) < G < 78 dB(mV) | 78 dB(mV) < G |
| | AND | AND | OR |
| CP Level Modifier | Adequate CP | Adequate to Marginal CP Level | All indications with Inadequate CP |
| Inspection TOOL 4 "DCVG" | | | |
| H= Coating Defect Size [%IR] | 5%IR < H < 35%IR | 35%IR < H < 60 %IR | 60%IR < H |
| | AND | OR | OR |
| I= Corrosion State Assessment (Normal Operating Conditions) | I = Cathodic/Cathodic or Cathodic/Neutral | All Indications 5%IR < H < 50%IR Where I=Cathodic/Anodic | All Indications Where I=Anodic/Anodic |
| | AND | AND | OR |
| CP Level Modifier | Adequate CP | Adequate to Marginal CP Level | All indications with Inadequate CP |
| Inspection TOOL MODIFIER 1 – Soil Resistivity (Not an independent TOOL) | | | |
| J= Soil Resistivity Designation | J > 10,000 Ω- cm | 2,000< J< 10,000 Ω- cm | J < 2,000 Ω - cm (e.g Subkha) |
| | AND | AND | OR |
| CP Level Modifier | Adequate CP | Adequate to Marginal CP Level | All area with Inadequate CP |
| Inspection TOOL MODIFIER 2– Metal - loss corrosion (ML) (Not an independent TOOL) | | | |
| K= Metal Loss (%) within 100m of the ILI dig | ML< 40% pit depth | 40%< ML < 60% pit depth | ML > 60% pit depth |

FIG. 3

400

| | Prioritization | | | | |
|---|---|---|---|---|---|
| Soil Resistivity & CP | Two Tools with Soil Modifier | | Inspection Tool 1 Classification | | |
| | | | Severe | Moderate | Minor |
| Severe (e.g. Subkha) ρ <2,000 | Inspection Tool 2 Classification | Severe | Immediate | Immediate | Scheduled |
| | | Moderate | Immediate | Scheduled | Scheduled |
| | | Minor | Scheduled | Scheduled | Monitored |
| Moderate (Soil 2,000< ρ <10,000) | | Severe | Immediate | Scheduled | Scheduled |
| | | Moderate | Scheduled | Scheduled | Monitored |
| | | Minor | Monitored | Monitored | Monitored |
| Minor (e.g. Soft or Dry) Soil ρ >10,000 | | Severe | Immediate | Scheduled | Monitored |
| | | Moderate | Scheduled | Monitored | Monitored |
| | | Minor | Monitored | Monitored | Monitored |

FIG. 4

500

| | | | Prioritization | | |
|---|---|---|---|---|---|
| Soil Resistivity | | | CP Level Classification | | |
| | Categories (CP & Metal-loss corrosion (ML)) | | Severe (Inadequate CP) | Moderate (Adequate to Marginal CP Level) | Minor (Adequate CP) |
| Severe (e.g. Subkha) ρ <2,000 | Metal-loss corrosion (ML) | ML > 60% | Immediate | Immediate | Immediate |
| | | 40%< ML< 60% | Immediate | Scheduled | Scheduled |
| | | 30%< ML< 40% | Scheduled | Scheduled | Monitored |
| | | 20%< ML< 30% | Scheduled | Monitored | Monitored |
| | | ML< 20% | Monitored | Monitored | Monitored |
| Moderate (Soil 2,000< ρ <10,000) | | ML > 60% | Immediate | Immediate | Immediate |
| | | 40%< ML< 60% | Immediate | Scheduled | Scheduled |
| | | 30%< ML< 40% | Scheduled | Monitored | Monitored |
| | | 20%< ML< 30% | Monitored | Monitored | Monitored |
| | | ML< 20% | Monitored | Monitored | Monitored |
| Minor (e.g. Soft or Dry) Soil ρ >10,000 | | ML > 60% | Immediate | Immediate | Immediate |
| | | 40%< ML< 60% | Scheduled | Scheduled | Monitored |
| | | 30%< ML< 40% | Monitored | Monitored | Monitored |
| | | 20%< ML< 30% | Monitored | Monitored | Monitored |
| | | ML< 20% | Monitored | Monitored | Monitored |

FIG. 5

600

| | Prioritization | | |
|---|---|---|---|
| | CP Level Classification | | |
| Soil Resistivity | Severe (Inadequate CP) | Moderate (Adequate to Marginal CP Level) | Minor (Adequate CP) |
| Severe (e.g. Subkha) ρ <2,000 | Immediate | Immediate | Immediate |
| Moderate (Soil 2,000< ρ <10,000) | Immediate | Scheduled | Scheduled |
| Minor (e.g. Soft or Dry) Soil ρ >10,000 | Scheduled | Scheduled | Scheduled |

FIG. 6

ASSESSMENT OF EXTERNAL COATING DEGRADATION SEVERITY FOR BURIED PIPELINES

TECHNICAL FIELD

This disclosure generally relates to integrity of buried pipelines.

BACKGROUND

Buried pipelines are subject to environmental impact, giving rise to erosion over time. Inspection and assessment of the external coating of buried pipelines are often performed.

SUMMARY

In one aspect, the present disclosure describes a computer-implemented method that includes: determining a category of a buried pipeline based on a compatibility with cathodic protection and a setup status of the buried pipeline, wherein the buried pipeline includes an external coating on an exterior surface of the buried pipeline; accessing input data from one or more inspection tools, wherein the one or more inspection tools are configured to monitor respective operating conditions of the buried pipeline; analyzing the input data from the one or more inspection tools in a manner specific to the determined category of the buried pipeline; and determining a prioritization schedule to maintain the external coating on the exterior surface of the buried pipeline.

Implementations may include one or more of the following features.

The buried pipeline may be one of shielding or non-shielding based on the compatibility with cathodic protection. The buried pipeline may be one of scrapable or un-scrapable based on the setup status of the buried pipeline. Determining the category of the buried pipeline may include: classifying the buried pipeline as one of: a scrapable shielding coating buried pipeline, a scrapable non-shielding coating buried pipeline, an un-scrapable shielding coating buried pipeline, and an un-scrapable non-shielding coating buried pipeline.

The computer-implemented method may further include: subsequent to determining a category of a buried pipeline, awaiting the input data from the one or more inspection tools as the input data is generated from monitoring the respective operating conditions of the buried pipeline.

The one or more inspection tools may include: a close interval survey tool, an ACCA (alternating current, current attenuation) tool, an ACVG (alternating current voltage gradient) tool, a DCVG (direct current voltage gradient) tool. Each of the one or more inspection tools may provide respective quantitative measurements indicating a severity level of a degradation of the external coating on the exterior surface of the buried pipeline.

Accessing the input data may further include: accessing input data encoding one or more inspection tool modifiers. The one or more inspection tool modifiers may include: a soil resistivity measure, or a metal loss (ML) corrosion measure. Analyzing the input data may include: using the one or more inspection tool modifiers to process the input data in the manner specific to the determined category of the buried pipeline.

In another aspect, the present disclosure describes computer system comprising one or more processors configured to perform operations of: determining a category of a buried pipeline based on a compatibility with cathodic protection and a setup status of the buried pipeline, wherein the buried pipeline includes an external coating on an exterior surface of the buried pipeline; accessing input data from one or more inspection tools, wherein the one or more inspection tools are configured to monitor respective operating conditions of the buried pipeline; analyzing the input data from the one or more inspection tools in a manner specific to the determined category of the buried pipeline; and determining a prioritization schedule to maintain the external coating on the exterior surface of the buried pipeline.

Implementations may include one or more of the following features.

The buried pipeline may be one of shielding or non-shielding based on the compatibility with cathodic protection. The buried pipeline may be one of scrapable or un-scrapable based on the setup status of the buried pipeline. Determining the category of the buried pipeline may include: classifying the buried pipeline as one of: a scrapable shielding coating buried pipeline, a scrapable non-shielding coating buried pipeline, an un-scrapable shielding coating buried pipeline, and an un-scrapable non-shielding coating buried pipeline.

The operations may further include: subsequent to determining a category of a buried pipeline, awaiting the input data from the one or more inspection tools as the input data is generated from monitoring the respective operating conditions of the buried pipeline.

The one or more inspection tools may include: a close interval survey tool, an ACCA (alternating current, current attenuation) tool, an ACVG (alternating current voltage gradient) tool, a DCVG (direct current voltage gradient) tool. Each of the one or more inspection tools may provide respective quantitative measurements indicating a severity level of a degradation of the external coating on the exterior surface of the buried pipeline.

Accessing the input data may further include: accessing input data encoding one or more inspection tool modifiers. The one or more inspection tool modifiers may include: a soil resistivity measure, or a metal loss (ML) corrosion measure. Analyzing the input data may include: using the one or more inspection tool modifiers to process the input data in the manner specific to the determined category of the buried pipeline.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

FIG. 2 illustrates an example of a table for one scenario of a buried pipeline according to an implementation of the present disclosure.

FIG. 3 illustrates an example of various inspection tools according to an implementation of the present disclosure.

FIG. 4 illustrates an example of a table for another scenario of a buried pipeline according to an implementation of the present disclosure.

FIG. 5 illustrates an example of a table for yet another scenario of a buried pipeline according to an implementation of the present disclosure.

FIG. 6 illustrates an example of a table for still another scenario of a buried pipeline according to an implementation of the present disclosure.

Like reference numbers and designations in the various drawings indicate like elements.

DETAILED DESCRIPTION

The disclosed technology is directed to system and method capable of assessing the overall condition of the protective coating to strategize maintenance. While utilizing cathodic protection current and above ground inspection tool to assess the degradation of the protective coating, some implementations operate on, for example, six data inputs (namely, coating Type, soil resistivity, cathodic protection current, metal-loss corrosion, close interval survey, and alternating current voltage gradient or direct current voltage gradient) to perform a comprehensive analysis of the external protective coating of a buried pipeline. In addition, the methods demonstrate both the risk associated with each data input and the total severity level of the coating degradation.

Figure 1A:
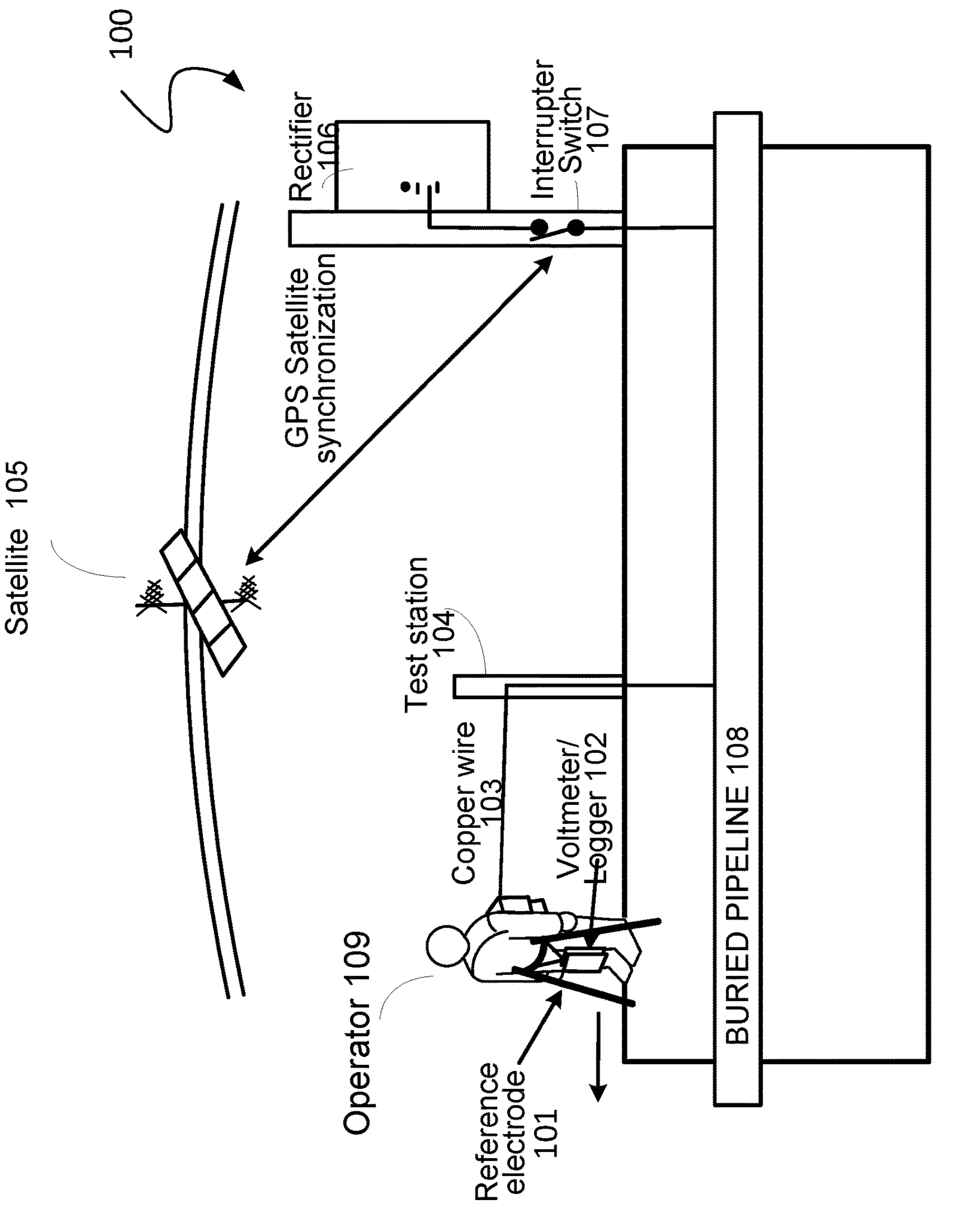
FIG. 1A is a diagram illustrating an example of assessing external coating degradation for buried a pipeline according to an implementation of the present disclosure.

Referring to FIG. 1A, diagram 100 illustrates an example of assessing external coating degradation for a buried pipeline 108. Here, an operator 109 may inspect integrity of the buried pipeline 109. The operator 109 may carry a backpack with a copper wire 103 connected via test station 104 to an exterior location on the buried pipeline 108. The operator may additionally carry a reference electrode and a voltmeter logger 102 as the operator traverses the surrounding territory to inspect pipeline quality on the ground (for example, over the buried pipeline 108). As illustrated, a rectifier 106 may be connected to the buried pipeline 108 via interrupter switch 107 to provide a DC power source. For example, the interrupter switch 107 can be controlled by satellite 105 under GPS satellite synchronization, for example, with the motion of the operator 109 such that the DC power source provides a DC voltage for the inspection loop at precisely controlled time points.

Figure 1B:
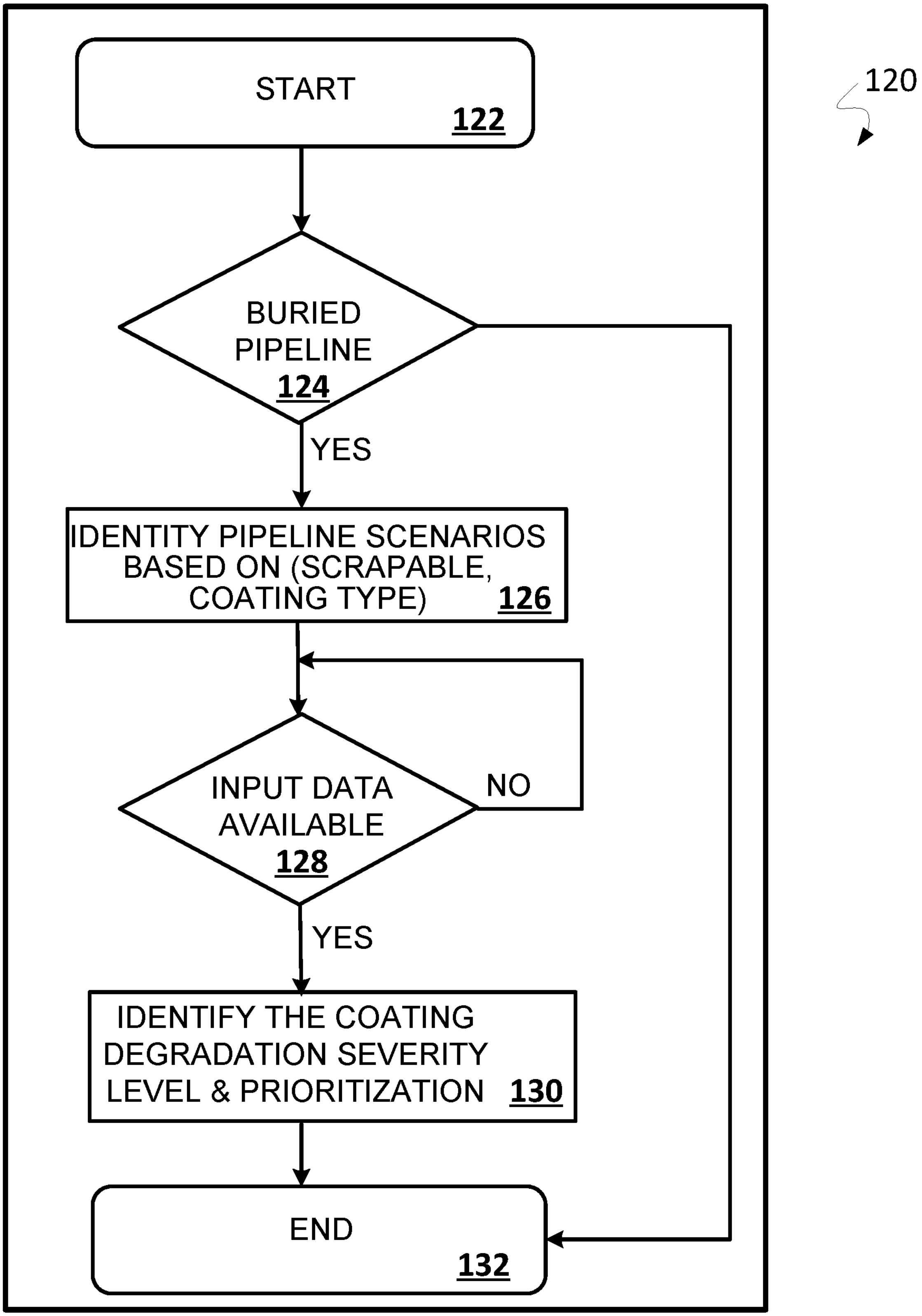
FIG. 1B is a flow chart illustrating an example of a process according to an implementation of the present disclosure

Some implementations include a process that provides the criteria to accurately identify and prioritize protective coating degradation using survey indication. Referring to FIG. 1B, flowchart 120 illustrates an example of a process according to some implementations of the present disclosure. When the process starts (122), the process may initially determine whether the pipeline under inspection is buried (124). If the pipeline under inspection is not buried, the process may terminate (132). If the pipeline under inspection is buried, the process may proceed to identify a specific scenario of the buried pipeline based on whether the pipeline is scrapable and the coating type of the pipeline (126).

The process of these implementations can rank the severity and maintenance priority of the external coating for buried pipelines first by dividing the coating into two categories in accordance to their compatibility with Cathodic Protection (as shielding or non-shielding). The process may then divides the pipeline under inspection into additional categories for scrapable and un-scrapable pipelines. For illustration, a pipeline can be identified as scrapable when the design is equipped with receiver and launcher parts, which can enable an inspection tool called pigs to obtain high accuracy data about the condition of the underlying pipe. On the other hand, for an un-scrapable pipe, data may not be obtained using the pigs.

Once the buried pipeline is classified into one scenario, the process may then determine whether input data based on measurements from the buried pipeline is available (128). If no input data is available, the process may wait for the input data to become available. If input data is available, the process may proceed to identify the coating degradation severity level and the prioritization schedule (130) before the process terminates (132).

In these implementations, after the two-level hierarchy of classification, the proceed may proceed to correlate the data with the related to external corrosion parameters such as metal loss corrosion, coating condition, cathodic protection (CP) and soil resistivity based on the individual severities. As described in more details below, both coating type (shielding and non-shielding) and scrapability can be identified to enable the selection of the required data input. The prioritization can identify the severity level of each measured input based on international standards and best practices. The combination of all severity matrix yield to the prioritization result of the particular pipeline.

In some implementations, the process may use a combination of soil resistivity, cathodic protection current level, history of corrosion anomalies (in-line inspection), type of coating, and above-ground coating inspection technique. Assessing coating conditions can include evaluating and detecting evidence of onset of corrosion. System and method of the present disclosure can assess the condition of protective coating and the effectiveness of the corrosion control measure to mitigate corrosion underneath protective coating system.

Some implementations may analyze, for example, six different types of data input, namely, coating type, soil resistivity, cathodic protection (CP) current, metal-loss (ML) corrosion, close interval survey (CIS), and alternating current voltage gradient (ACVG) or direct current voltage gradient (DCVG). Table 1 below describes these sources of data obtained for the coating assessment.

TABLE 1

| Source of data | |
|---|---|
| Data | Source |
| Coating Type | Coating data sheet or Fourier Transform Infrared Spectroscopy test (FTIR) |
| Soil resistivity | Wenner 4 probe test |
| Cathodic Protection current | Potential measurement using multimeter |
| Metal-loss corrosion | Inline inspection tool (ILI) |
| Close interval survey | CIS survey technique result |
| Alternating Current Voltage Gradient | ACVG survey technique result |
| Direct Current Voltage Gradient | DCVG survey technique result |

TABLE 1-continued

| Source of data | |
|---|---|
| Data | Source |

In these implementations, the two-level scenario classification yields four scenarios, namely, (i) scrapable non-shielding coating for buried pipeline, (ii) un-scrapable non-shielding coating for buried pipeline, (iii) scrapable pipeline (shielding coating), and (iv) un-scrapable pipeline (shielding coating). The data analysis under each scenario is further respectively illustrated in FIGS. 2, 4, 5, and 6.

FIG. 2 shows an example of a table 200 for a prioritization of indications from various tools under the scenario of a scrapable non-shielding coating buried pipeline. Here, the first column corresponds to the first modifier parameter, namely the soil resistivity and cathodic protection (CP). As illustrated, a low range of soil resistivity, for example, under 2000 Ω-cm can indicate a relatively severe environment. In contrast, a high range of soil resistivity, for example, above 10000 Ω-cm can indicate a relatively dry environment that is minor for corrosion. Additionally, a medium range of soil resistivity, for example, between 2000 and 10000 Ω-cm can indicate a moderate environment for buried pipeline. The prioritization can triage the input data to classify a buried pipeline under this scenario into one of: I (immediate action required including excavation and recoating), S (scheduled action required to further evaluate on the excavation), and M (suitable for monitoring). Such diagnosis and prognosis are generated based on readings from two inspection tools and a second modifier parameter, namely, metal loss corrosion (ML). Here, metal loss corrosion is corresponded to the remaining wall thickness of the buried pipelines. As illustrated in FIG. 2, for example, the readings from inspection tool 2 classification and inspection tool 1 classification can jointly determine a specific row in FIG. 2. This specific row can be further tracked under the $2^{nd}$ modifier parameter, metal loss corrosion, to determine which prioritized schedule is generated. For example, when inspection tool 2 classification is severe, and inspection tool 1 classification is moderate, and soil resistivity parameter is moderate, the process generates an I (immediate action required) prioritized schedule when the ML parameter is above 40%. In comparison, when inspection tool 2 classification is severe, and inspection tool 1 classification is moderate, and soil resistivity parameter is moderate, the process generates an I (immediate action required) prioritized schedule only when the ML parameter is above 60%.

Further referring to FIG. 3, table 300 summarizes the indication severity classification criteria for four inspection tools that can be used by the table of FIG. 2. These four inspection tools include, namely, inspection tool 1 CIS (Close Interval Survey), inspection tool 2 ACCA (Alternating Current, Current Attenuation), inspection tool 3 ACVG (alternating current voltage gradient), and inspection tool 4 DCVG (direct current voltage gradient). Here, the CIS tool includes measurements of "OFF," "ON," "ON/OFF convergence," and "ON/OFF profile depression." Notably, the geometry or surface area of pipeline, which is relatively large, is called the off potential. In the particular scenario of FIG. 2, the CIS technique is utilized to on/off potential of the buried pipeline. Hence, the output result has no indication of metal loss. Here, ACCA measures the attenuation of the transmitted 4 Hz signal to establish the pattern of current loss. The results can be used to; indicate the condition of the pipeline coating. CP (cathodic protection) level modifier indicate the level to maintain the minimum on potential current delivered to the buried pipelines. The DCVG technique can be selected to indicate the coating condition. Here, the parameter of DCVG % IR is used for ranking the risk of coating defects.

FIG. 4 shows an example of a table 400 for a prioritization of indications from various inspection tools under the scenario of an un-scrapable non-shielding coating buried pipeline. Here, the soil resistivity and cathodic protection (CP) modifier in column 1 is likewise a factor in the calculus. Here, the readings from two inspection tools can jointly determine an output of prioritized schedule. For example, when the inspection tool 1 reads severe and the inspection tool 2 reads severe, and the soil resistivity is moderate, the prioritized schedule output is I (immediate action required). For comparison, when the inspection tool 1 reads severe and the inspection tool 2 reads moderate, and the soil resistivity is moderate, the prioritized schedule output becomes S (scheduled action required).

Further referring to FIG. 5, table 500 shows an example for a prioritization of indications from various tools under the scenario of a scrapable shielding coatings buried pipeline. Here, the soil resistivity in column 1 is similarly a factor in the calculus. As illustrated, the prioritization is then jointly determined by a CP (cathodic protection) level classification and a metal loss corrosion (ML) level. For example, when the soil resistivity is moderate, the prioritized schedule output is an I (immediate action required) if CP level classification is severe and ML level is above 40%. When the soil resistivity is moderate, and CP level classification is moderate, then the prioritized schedule output becomes an S (scheduled action required) only if the ML level is above 60%.

Further referring to FIG. 6, table 600 shows an example for a prioritization of indications from various inspection tools under the scenario of an un-scrapable shielding coatings buried pipeline. Here, the soil resistivity in column 1 is also a factor in the calculus. The prioritization becomes more dependent on the CL level classification. As illustrated, when the soil resistivity is moderate, the prioritized schedule output becomes an I (immediate action required) when the CL level classification is severe; and the prioritized schedule output becomes an S (scheduled action required) when the CL level classification is moderate.

Figure 7:
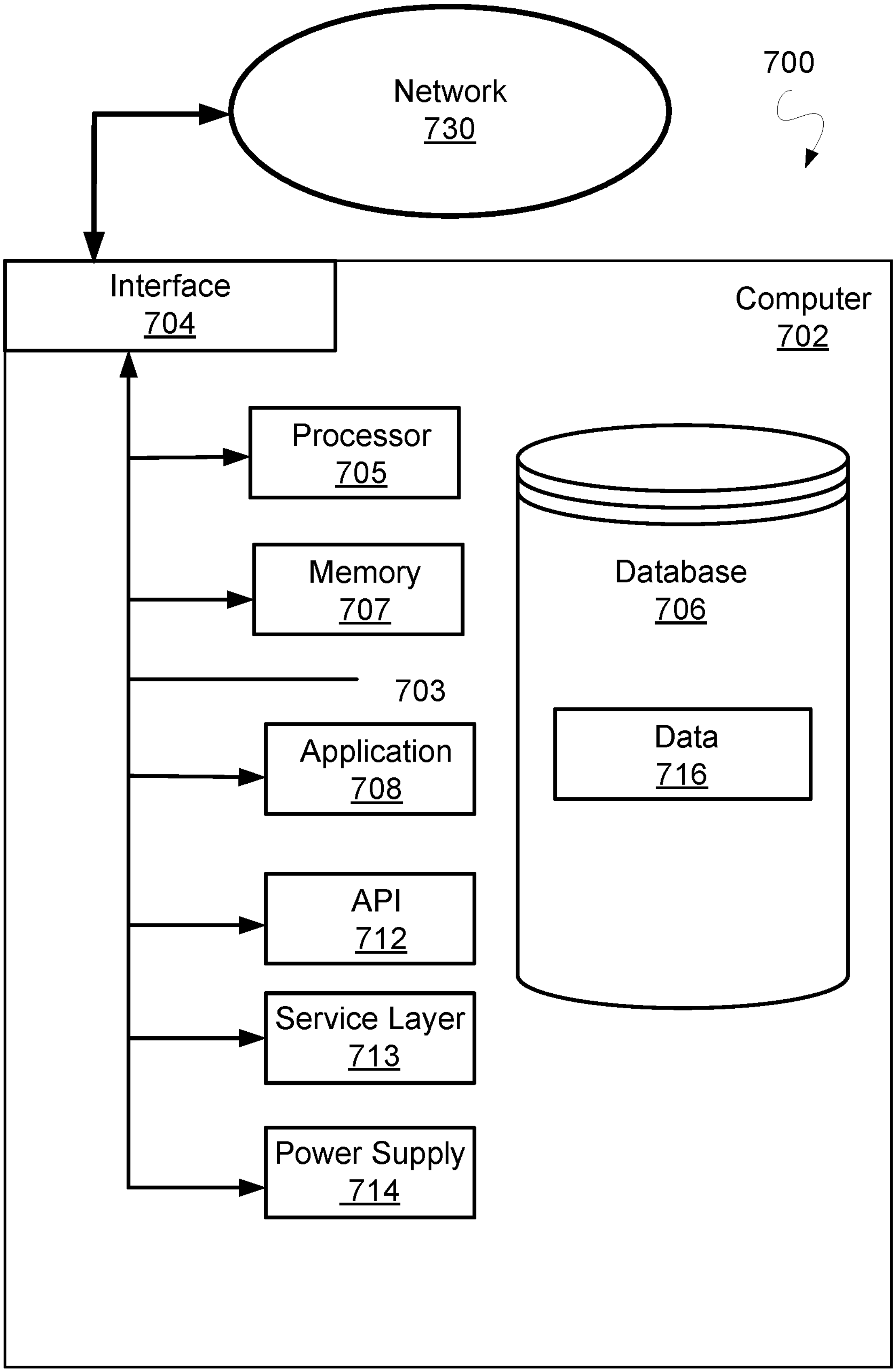
FIG. 7 is a block diagram illustrating an example of a computer system used to provide computational functionalities associated with described algorithms, methods, functions, processes, flows, and procedures, according to an implementation of the present disclosure.

FIG. 7 is a block diagram illustrating an example of a computer system 700 used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

The computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users, external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and comprises logic encoded in software, hardware, or a combination of software and hardware. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds the previously described data 716 including, for example, multiple streams of data from various inspection tools, such as the CIS (close interval survey) tool, the ACCA (alternating current, current attenuation) tool, the ACVG (alternating current voltage gradient) tool, and the DCVG (direct current voltage gradient) tool. The streams of data may also include inspection tool modifiers such as soil resistivity data, and metal loss corrosion data.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for maintaining an external coating of a buried pipeline by generating a prioritization schedule based on an assessed condition of the buried pipeline, the method comprising:

determining a category of the buried pipeline, comprising:

classifying the buried pipeline as shielding or non-shielding based on a compatibility with cathodic protection; and classifying the buried pipeline as scrapable or un-scrapable based on a setup status of the buried pipeline;

applying, to the buried pipeline to generate streams of input data measurements for transmission to a remote computing system, a pigs inspection tool if the buried pipeline is classified as scrapable, and a plurality of inspection tools selected from a close interval survey tool, an ACCA (alternating current, current attenuation) tool, an ACVG (alternating current voltage gradient) tool, and a DCVG (direct current voltage gradient) tool, or any combination thereof, wherein each inspection tool of the plurality of inspection tools includes at least one sensor configured to collect a stream of input data measurements by detecting properties of a physical environment around the buried pipeline, and wherein the input data measurements include an attenuation measurement of an alternating current signal applied to the buried pipeline, a pipe-to-soil potential measurement, an alternating current voltage gradient measurement, and a direct current voltage gradient measurement;

transmitting the streams of input data measurements to the remote computing system via a network;

receiving, by the remote computing system, the streams of input data measurements associated with the buried pipeline, wherein each of the streams of input data measurements encode one or more inspection tool modifiers that include: a soil resistivity measure, or a metal loss (ML) corrosion measure;

determining, for each inspection tool, by processing the streams of input data measurements received from the plurality of inspection tools, based on the determined category of the buried pipeline, a classification indicating a severity level of degradation of the external coating of the buried pipeline, wherein the classification is determined by identifying which of a set of predefined measurement ranges the stream of input data measurements corresponds to, each range being associated with a severity level, wherein the severity level is one of severe, moderate, or minor; and generating, by the remote computing system, the prioritization schedule for the buried pipeline, based on a severity matrix corresponding to the category of the buried pipeline, the severity matrix defining prioritization schedules based on (i) the one or more inspection tool modifiers, and (ii) the classification corresponding to each inspection tool indicating the severity level of degradation of the external coating of the buried pipeline, wherein the prioritization schedule determines maintenance actions for the buried pipeline, and the prioritization schedule is one of an I level meaning that an immediate action is required, an S level meaning that a scheduled action is further required), and an M level meaning that the buried pipeline is suitable for monitoring.

2. The method of claim 1, wherein the buried pipeline is one of shielding or non-shielding based on a compatibility with cathodic protection.

3. The method of claim 1, wherein the buried pipeline is one of scrapable or un-scrapable based on the setup status of the buried pipeline.

4. The method of claim 1, wherein determining the category of the buried pipeline comprises:

classifying the buried pipeline as one of: a scrapable shielding coating buried pipeline, a scrapable non-shielding coating buried pipeline, an un-scrapable shielding coating buried pipeline, and an un-scrapable non-shielding coating buried pipeline.

5. The method of claim 1, further comprising:

subsequent to determining a category of a buried pipeline, awaiting the streams of input data measurements from the plurality of inspection tools as the streams of input data measurements are generated from detecting properties of a physical environment around the buried pipeline.

6. A computer system for maintaining an external coating of a buried pipeline by generating a prioritization schedule based on an assessed condition of the buried pipeline, the computer system comprising one or more hardware processors configured to perform operations of:

determining a category of the buried pipeline, comprising:

classifying the buried pipeline as shielding or non-shielding based on a compatibility with cathodic protection; and classifying the buried pipeline as scrapable or un-scrapable based on a setup status of the buried pipeline;

applying, to the buried pipeline to generate streams of input data measurements for transmission to a remote computing system, a pigs inspection tool if the buried pipeline is classified as scrapable, and a plurality of inspection tools selected from a close interval survey tool, an ACCA (alternating current, current attenuation) tool, an ACVG (alternating current voltage gradient) tool, and a DCVG (direct current voltage gradient) tool, or any combination thereof, wherein each inspection tool of the plurality of inspection tools includes at least one sensor configured to collect a stream of input data measurements by detecting properties of a physical environment around the buried pipeline, and wherein the input data measurements include an attenuation measurement of an alternating current signal applied to the buried pipeline, a pipe-to-soil potential measurement, an alternating current voltage gradient measurement, and a direct current voltage gradient measurement;

transmitting the streams of input data measurements to the remote computing system via a network;

receiving, by the remote computing system, the streams of input data measurements associated with the buried pipeline, wherein each of the streams of input data measurements encode one or more inspection tool modifiers that include: a soil resistivity measure, or a metal loss (ML) corrosion measure;

determining, for each inspection tool, by processing the streams of input data measurements received from the plurality of inspection tools, based on the determined category of the buried pipeline, a classification indicating a severity level of degradation of the external coating of the buried pipeline, wherein the classification is determined by identifying which of a set of predefined measurement ranges the stream of input data measurements corresponds to, each range being associated with a severity level, wherein the severity level is one of severe, moderate, or minor; and generating, by the remote computing system, the prioritization schedule for the buried pipeline, based on a severity matrix corresponding to the category of the buried pipeline, the severity matrix defining prioritization schedules based on (i) the one or more inspection tool modifiers, and (ii) the classification corresponding to each inspection tool indicating the severity level of degradation of the external coating of the buried pipeline, wherein the prioritization schedule determines maintenance actions for the buried pipeline, and the prioritization schedule is one of an I level meaning that an immediate action is required, an S level meaning that a scheduled action is further required), and an M level meaning that the buried pipeline is suitable for monitoring.

7. The computer system of claim 6, wherein the buried pipeline is one of shielding or non-shielding based on a compatibility with cathodic protection.

8. The computer system of claim 6, wherein the buried pipeline is one of scrapable or un-scrapable based on the setup status of the buried pipeline.

9. The computer system of claim 6, wherein determining the category of the buried pipeline comprises:

classifying the buried pipeline as one of: a scrapable shielding coating buried pipeline, a scrapable non-shielding coating buried pipeline, an un-scrapable shielding coating buried pipeline, and an un-scrapable non-shielding coating buried pipeline.

10. The computer system of claim 6, wherein the operations further comprise:

subsequent to determining a category of a buried pipeline, awaiting the streams of input data measurements from the plurality of inspection tools as the streams of input data measurements are generated from detecting properties of a physical environment around the buried pipeline.

11. The method of claim 1, wherein applying the plurality of inspection tools further comprises inspecting pipeline quality on a ground over the buried pipeline using a reference electrode and a voltmeter logger.

12. The computer system of claim 6, wherein applying the plurality of inspection tools further comprises inspecting pipeline quality on a ground over the buried pipeline using a reference electrode and a voltmeter logger.

* * * * *